US005431980A

United States Patent [19]

McCarthy

[11] Patent Number: 5,431,980

[45] Date of Patent: Jul. 11, 1995

[54] FORMABLE CELLULAR MATERIAL WITH SYNCLASTIC BEHAVIOR

[76] Inventor: Daniel J. McCarthy, 35 Fifer La., Lexington, Mass. 02173

[21] Appl. No.: 11,679

[22] Filed: Feb. 1, 1993

[51] Int. Cl.[6] .......... B32B 3/12

[52] U.S. Cl. .......... 428/116; 428/117; 428/118; 428/156; 428/166; 428/178; 428/181; 428/188

[58] Field of Search .......... 428/116, 117, 118, 156, 428/166, 178, 181, 188

[56] References Cited

U.S. PATENT DOCUMENTS

| | | | |
|---|---|---|---|
| 2,333,343 | 11/1943 | Sendzimir | 428/116 |
| 2,771,384 | 11/1956 | Collins | 428/116 |
| 2,848,132 | 8/1958 | Davous | 428/116 |
| 3,070,198 | 12/1962 | Haskell | 428/116 |
| 3,086,624 | 4/1963 | Wyatt | 428/116 |
| 3,109,766 | 11/1963 | Norris | 428/116 |
| 3,227,600 | 1/1966 | Holland | 428/116 |
| 3,340,023 | 9/1967 | Hulsey | 428/116 |
| 3,342,666 | 9/1967 | Hull | 428/116 |
| 3,432,379 | 3/1969 | Anderson | 428/116 |
| 3,501,367 | 3/1970 | Parker | 428/116 |
| 3,616,141 | 10/1971 | Anderson | 428/116 |
| 3,639,106 | 2/1972 | Yate | 428/116 |
| 3,669,820 | 6/1972 | Fredericks | 428/116 |
| 3,756,904 | 9/1973 | Fredericks | 428/116 |
| 3,872,564 | 3/1975 | Myers et al. | 428/116 |
| 3,906,616 | 9/1975 | Bryand | 428/116 |
| 3,913,210 | 10/1975 | Broad | 428/116 |
| 3,916,054 | 10/1975 | Long et al. | 428/116 |
| 3,991,245 | 11/1976 | Jackson | 428/116 |
| 4,037,751 | 7/1977 | Miller | 428/116 |
| 4,050,131 | 9/1977 | Bryand | 428/116 |
| 4,063,742 | 12/1977 | Watkins, Jr. | 428/116 |
| 4,218,066 | 8/1980 | Ackermann | 428/116 |
| 4,477,089 | 10/1984 | Hoffman et al. | 428/116 |
| 4,551,604 | 11/1985 | Campbell | 428/116 |
| 4,632,862 | 12/1986 | Mullen | 428/116 |
| 4,859,517 | 8/1989 | Hull | 428/116 |
| 5,310,586 | 5/1994 | Mullen | 428/34.1 |

*Primary Examiner*—William P. Watkins, III
*Attorney, Agent, or Firm*—Wolf, Greenfield & Sacks

[57] ABSTRACT

Cellular material formed from a plurality of component strips each comprising alternate ridge portions and groove portions interconnected by step portions, the step portions comprising a first riser, a second riser, and a furrowed step surface. The furrowed step surface has at least one indentation formed therein, preferably two oppositely-directed semicircular indentations. The resulting interconnected array of substantially identical cell units defines a sheet of cellular material exhibiting highly synclastic behavior. In an alternate embodiment, the step portion is replaced by a slope portion having at least one semicircular indentation formed therein. A method of fabrication of the novel cellular material is also provided.

16 Claims, 9 Drawing Sheets

FORMABLE CELLULAR MATERIAL WITH SYNCLASTIC BEHAVIOR

FIELD OF THE INVENTION

The present invention relates generally to cellular material and more specifically to a particular type of cellular material in which unique features of the cell unit shape impart highly synclastic behavior to the overall material, and a method of forming such material.

BACKGROUND DESCRIPTION

Cellular materials find much use in applications in which structural materials having both strength and light weight are required. Generally, a sheet of cellular material is formed from a plurality of thin strips of ribbon formed of one of many structural materials such as aluminum, stainless steel, paper, etc. Typically, each strip is formed into a periodic corrugated shape and the component strips are stacked and fastened together at abutting surfaces to form a matrix comprising a repeating pattern of cell units, often substantially identical cell units, which define the sheet. Typically, cellular material is made up of ribbon defining cell units having a honeycomb (hexagonal), or square shape, or derivatives thereof.

Unless fabricated specifically to conform to a particular predetermined shape, such a sheet is typically substantially flat, and reference may be made to the sheet according to x and y axes defining a plane parallel to the sheet, and a z-axis which passes through the sheet perpendicularly. Typically, the strips of ribbon which make up cellular material are in a substantially perpendicular relation to the x-y plane, and one advantageous characteristic of such cellular material is that it has a high strength-to-weight ratio along its z-axis.

Fabrication of cellular material may be carried out in a number of ways and typically involves ribbon corrugation and subsequent assembly of component strips. U.S. Pat. No. 4,632,862, incorporated herein by reference, discloses two common methods of corrugation: rolling and stamping. According to the rolling method, strips of ribbon are fed through cooperating forming rolls having complementary peripheral teeth which mesh together upon the ribbon to form the desired corrugations. According to the stamping method, ribbon is corrugated as it is fed through a die stamping machine. At the completion of the stamping or rolling process, component strips of ribbon material are stacked such that the lowest sections of each corrugated strip contact the highest sections of the corrugated strip upon which it is stacked, and the contacting sections, or nodal junctions, are fastened by means such as brazing, welding, or adhesion. According to another method of fabrication disclosed in U.S. Pat. No. 3,086,624, incorporated herein by reference, one continuous ribbon is fan-folded at regular intervals to form a sheet of cellular material.

According to each of these methods, the thickness of a sheet of cellular material (that is, its dimension along the z-axis) is defined by the width of the component strips of ribbon from which it is fabricated, and the length and width of the sheet, its dimensions along the x and y axes, are defined by the length of the ribbons after corrugation formation (or the length of each fan-folded segment according to that method), and the number of strips incorporated multiplied by the overall depth of corrugation of each strip of ribbon (or each fan-folded segment).

Another well-known method of fabrication of cellular material involves stacking multiple flat strips of ribbon in a manner such that each strip is fastened at a first set of regular intervals along its length to the strip upon which it is stacked, and fastened at a second set of regular intervals along its length to the strip which is stacked upon it, the second set of regular intervals falling midway between the first set of regular intervals. The material is then mechanically expanded by pulling the first strip and the final strip of the stack apart. According to the method, the unjoined strip sections separate to define open cell units having a hexagonal, roughly hexagonal, or roughly square shape.

Examples of applications for which cellular materials are ideally suited include structures in aircraft and ships; in the construction industry for contoured and flat laminate structures; for surrounding high-pressure containment structures for safety reasons, for example steam pipes in nuclear power plants; for electromagnetic insulation, for example to insulate sensitive instrumentation from radio waves; for flow control applications; for sound insulation; and as structures to increase turbulence in labyrinth seals.

In many of these and other applications, it is desirable to employ a cellular material which may be routinely fabricated as a substantially flat sheet, but which is easily conformable to cylindrical or other curved surfaces (such as jet aircraft engines for sound insulation or steam pipes in nuclear facilities), or to highly irregular surfaces. However, heretofore available cellular materials are not easily formable to such surfaces, but commonly must be fabricated to conform specifically to a particular surface shape.

The lack of formability of known cellular materials is due to their inherent anticlastic behavior. Such behavior is defined by a material's tendency to "saddle" in a direction perpendicular to the direction in which the material is bent. That is, when the material is bent along its x-axis so as to form an arc of a circle having a center on a first side of the material, the material spontaneously curves along its y-axis in a direction so as to form an arc of a circle having a center on the side of the material opposite the first side. Such behavior is most pronounced in cellular material that is relatively stiff along its x and y axes, and may be advantageous in circumstances in which such stiffness is desired. However, this characteristic is highly undesirable in the above-mentioned applications in which material highly conformable to cylindrical or spherical surfaces or highly irregular surfaces, while maintaining a substantially perpendicular relation between the material's ribbon strips and the surface to which the martial is to conform, is advantageously utilized. U.S. Pat. No. 3,340,023, incorporated herein by reference, discloses a cellular material which is somewhat formable to curved surfaces. However, the material exhibits anticlastic behavior to some extent and is not suitable for many applications.

Accordingly, general purposes of the present invention are to provide a cellular material which exhibits highly synclastic behavior, that is, which is highly formable without saddling, to provide a cellular material which may be easily and inexpensively fabricated as a substantially flat sheet and which may then conform to any of a variety of surface shapes; and to provide a method of fabrication of such material.

SUMMARY OF THE INVENTION

The foregoing and other objects and advantages of the present invention are achieved by providing cellular material fabricated from corrugated strips of ribbon having furrowed surfaces at predetermined locations therealong, the locations selected so as to tailor the formability of the material. Typically, the material comprises a plurality of component strips, each comprising alternate ridge portions and groove portions interconnected by step portions. The strips are arranged in a stacked array with the ridge portions of the component strips facing the groove portions of adjacent component strips, some of the ridge portions being fastened to some of the groove portions, and at least one of the step portions of each component strip comprising a first riser extending upwardly from the groove portion, a second riser extending downwardly from the ridge portion, and a furrowed step surface extending between the first riser and the second riser.

For an alternative embodiment of the invention, the alternate ridge portions and groove portions are interconnected by slope portions, at least one of the slope portions having at least one indentation formed therein. The strips are arranged and fastened in accordance with the preceding paragraph.

For still another embodiment, the cellular material comprises a plurality of substantially identical cell units each having a substantially cross-shaped cross-sectional configuration, arranged in a matrix array of interconnected cell units, each cross-shaped cell unit containing an upper arm, a lower arm, and first and second lateral arms, with at least one wall of at least one of said arms being furrowed.

Various embodiments of the invention may be fabricated according to a modification of the well-known expanded-core technique. According to the known technique, a plurality of component strips are stacked with adhesive applied to predetermined positions at regular intervals along the strips, the regular intervals being staggered for each strip. According to the modification, indentations are then formed in the stack of component strips at locations falling approximately midway between the staggered positions to which adhesive is applied. The first strip is then drawn in a direction away from the final strip of the stack to expand the material.

BRIEF DESCRIPTION OF THE DRAWINGS

Other advantages, novel features and objects of the invention will become apparent from the following detailed description of the invention when considered in conjunction with the accompanying drawings in which.

Figure 5A:
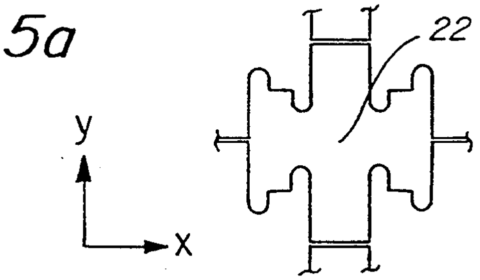
Figure 5B:
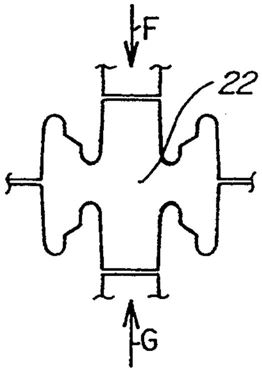
Figure 5C:
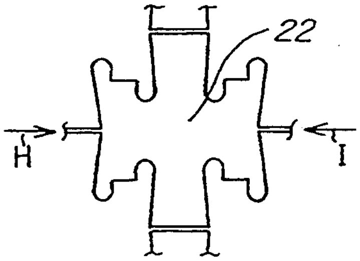
Figure 5D:
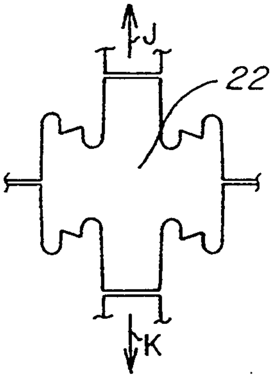
Figure 5E:
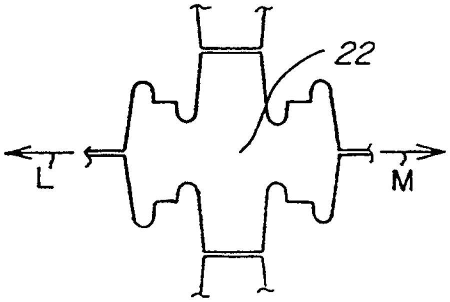
Figure 6:
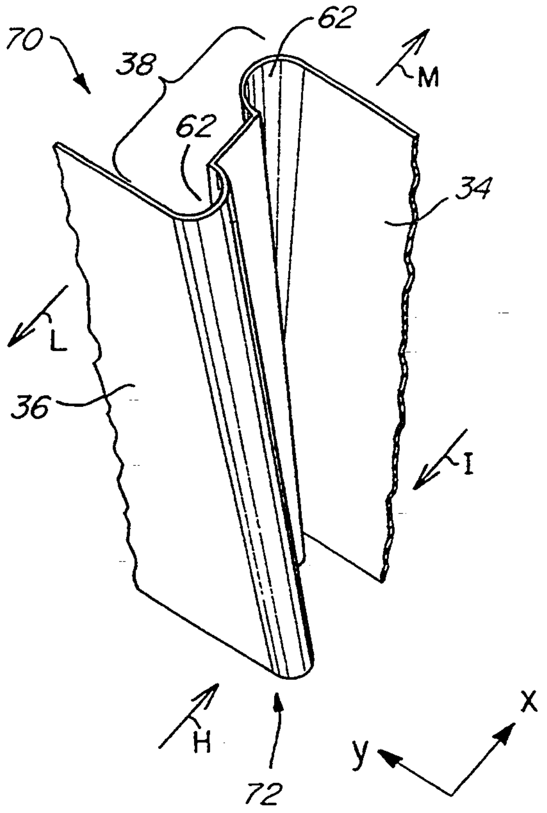
Figure 7:
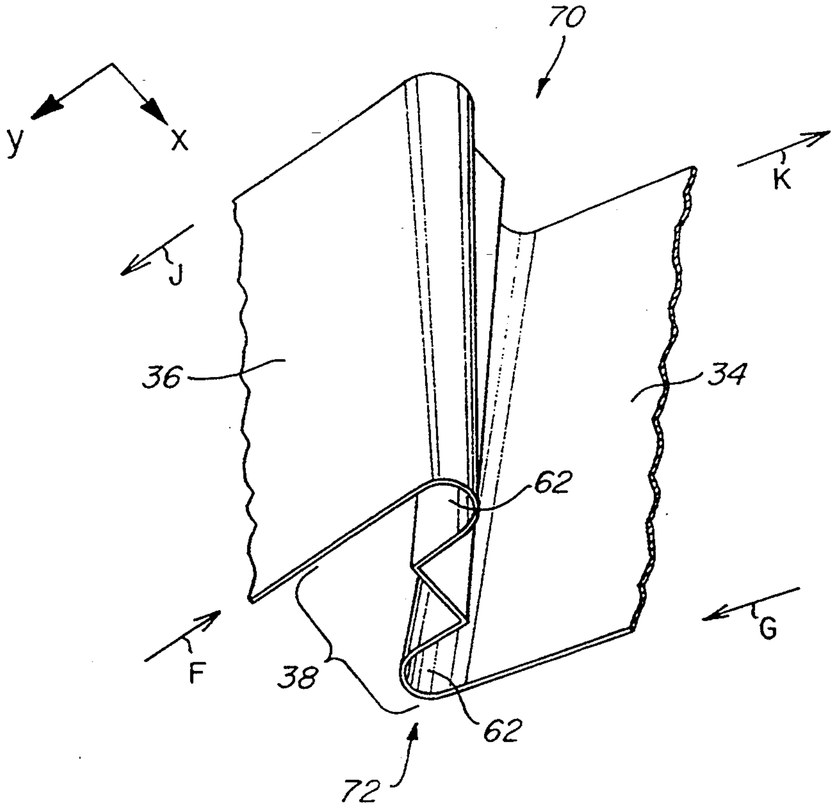
Figure 9:
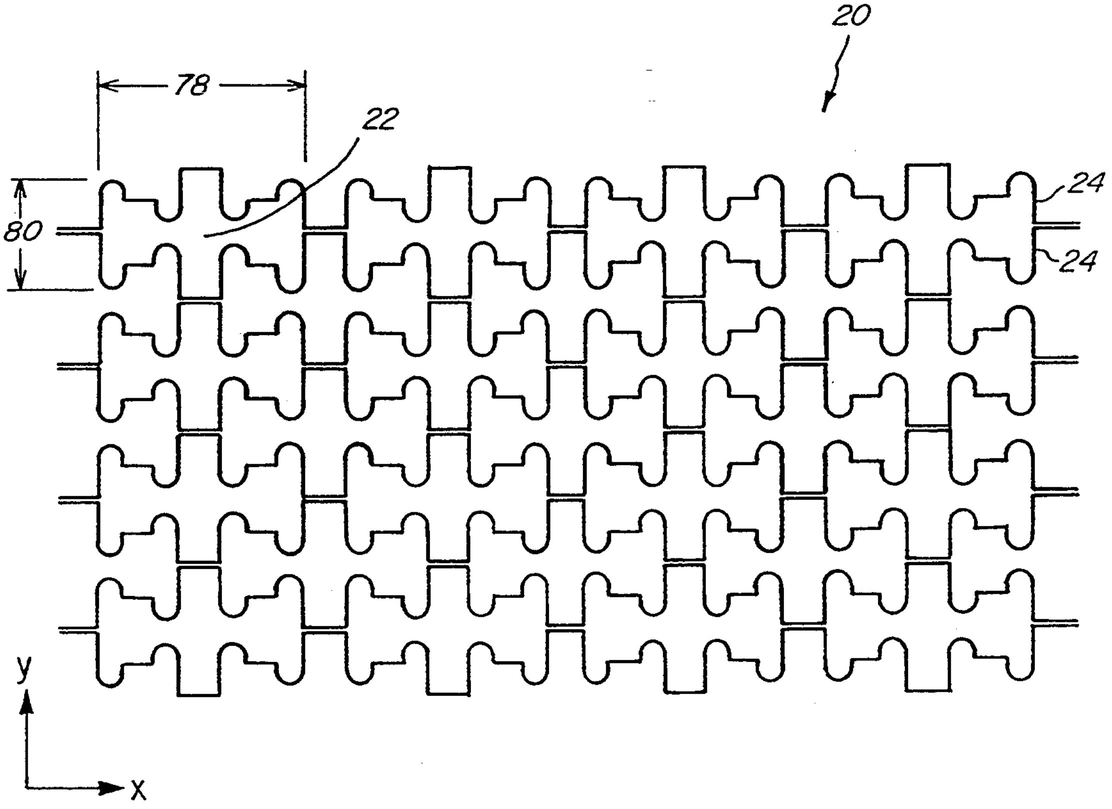
Figure 10:
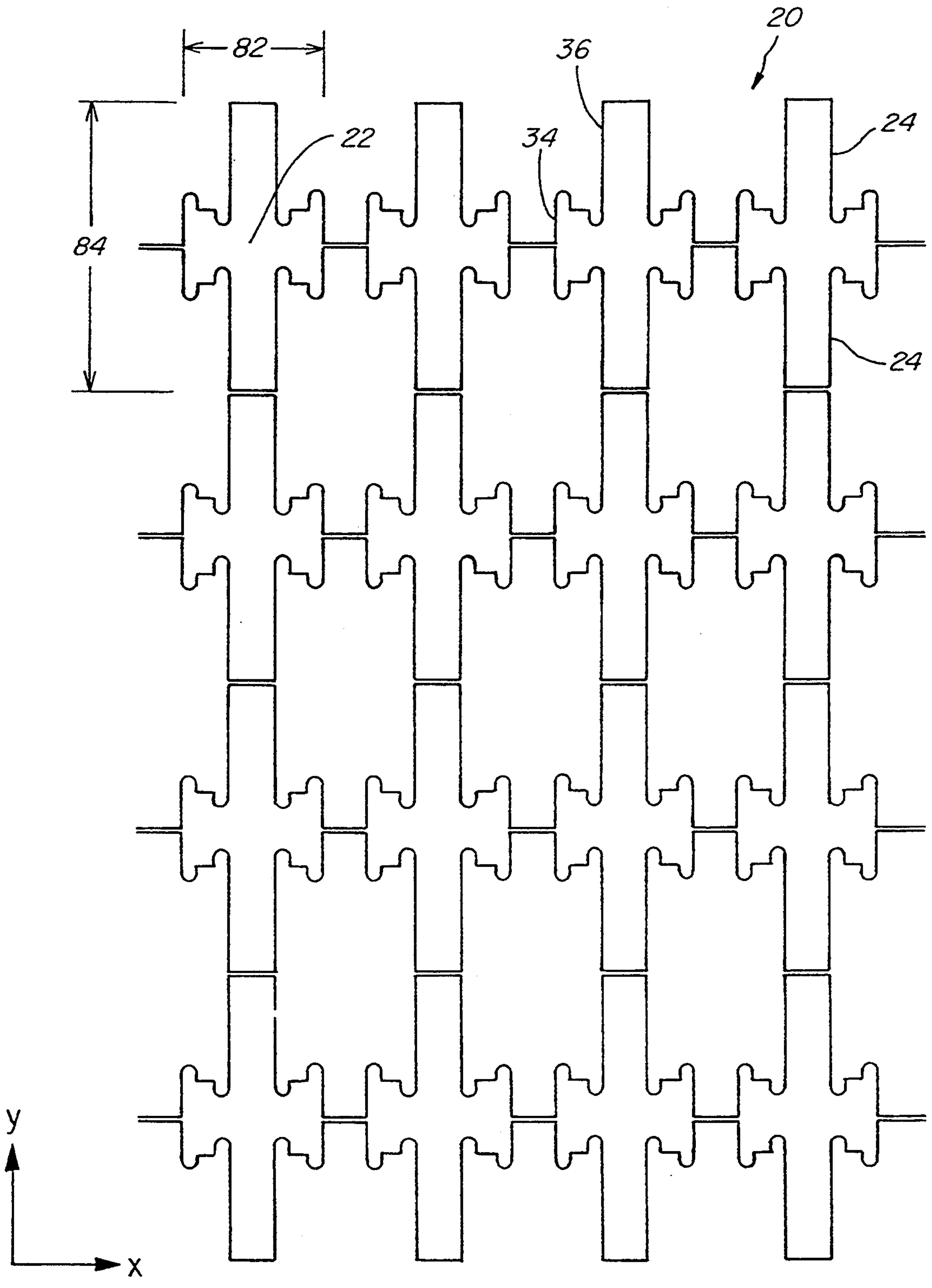
Figure 11:
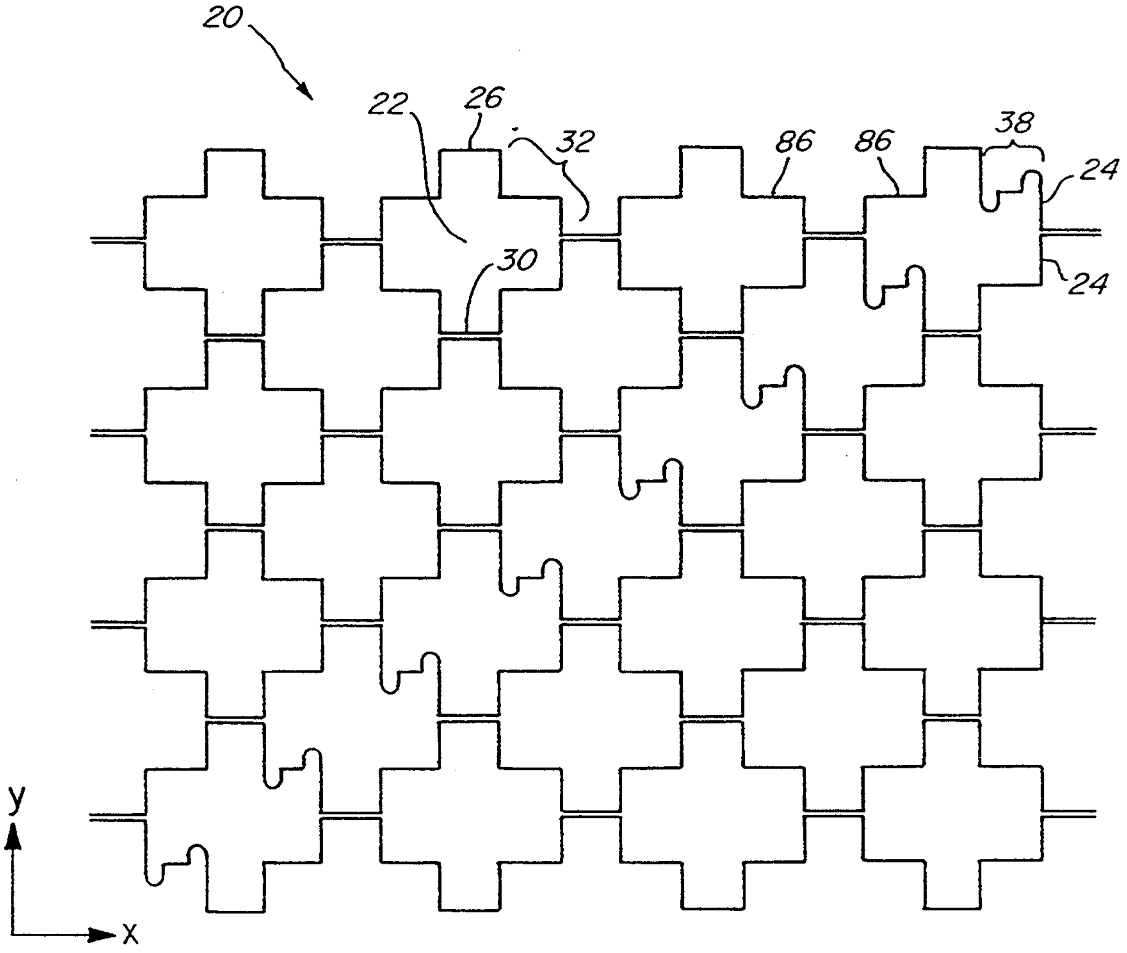
Figure 12:
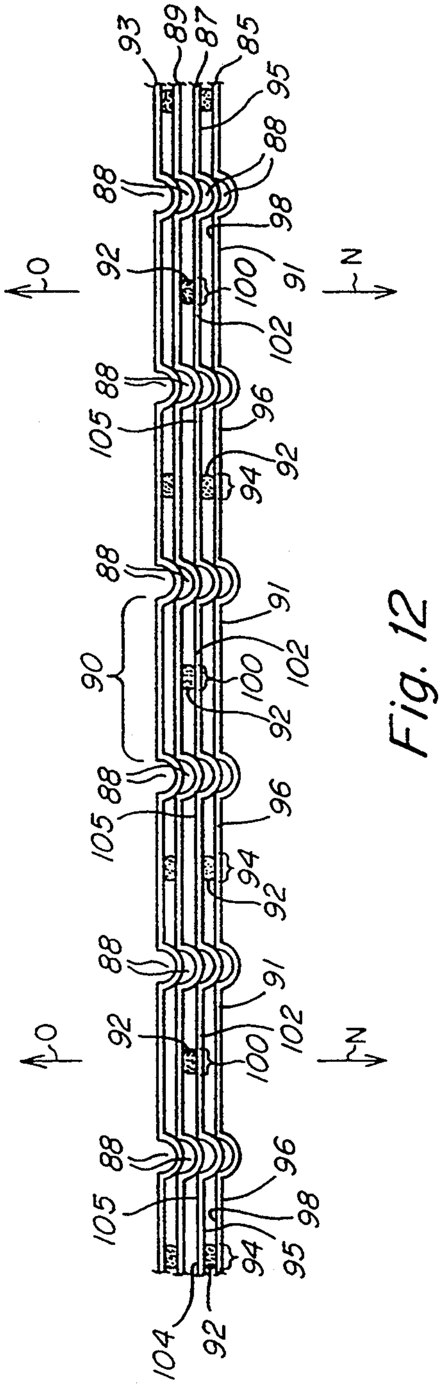
Figure 13:
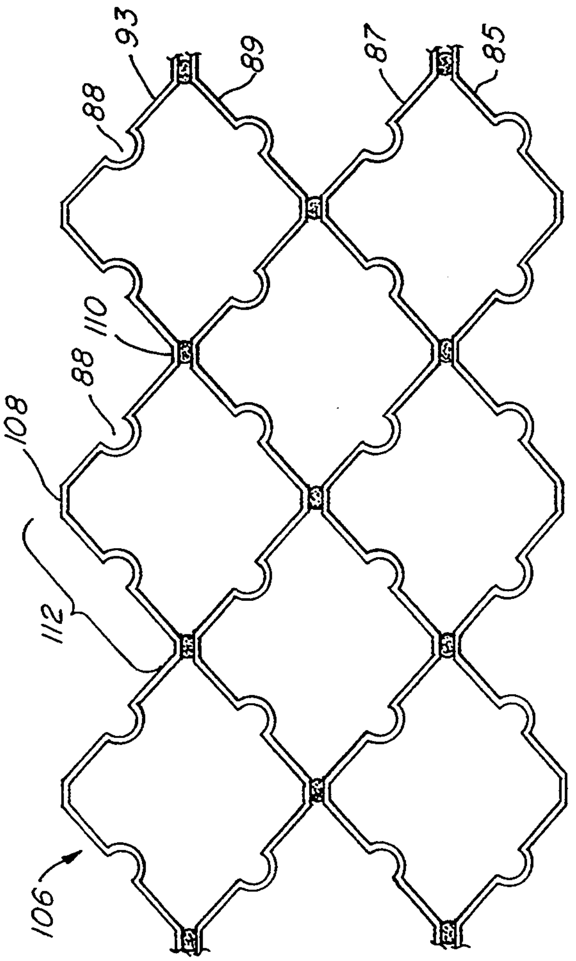

FIGS. *5a–5e* are top views of a single cell unit of the cellular material illustrated in FIGS. 1–4 as it is expanded and compressed along two axes during flexure of the material;

FIG. 6 illustrates a step portion of a cell unit of the cellular material illustrated in FIGS. 1–5, flexed in a particular direction;

FIG. 7 illustrates the segment of the cell unit of the cellular material illustrated in FIG. 6, flexed in a second direction;

FIGS. *8a–8f* are top views of step portions of cell units of cellular material according to alternate embodiments of the present invention;

FIG. 9 illustrates cellular material made in accordance with another embodiment of the present invention;

FIG. 10 illustrates cellular material made in accordance with yet another embodiment of the present invention;

FIG. 11 illustrates cellular material made in accordance with yet another embodiment of the present invention;

FIG. 12 illustrates component strips of ribbon material formed and adhered prior to expansion according to a method of the present invention; and FIG. 13 illustrates the cellular material illustrated in FIG. 12, subsequent to expansion.

DETAILED DESCRIPTION OF THE INVENTION

Figure 1:
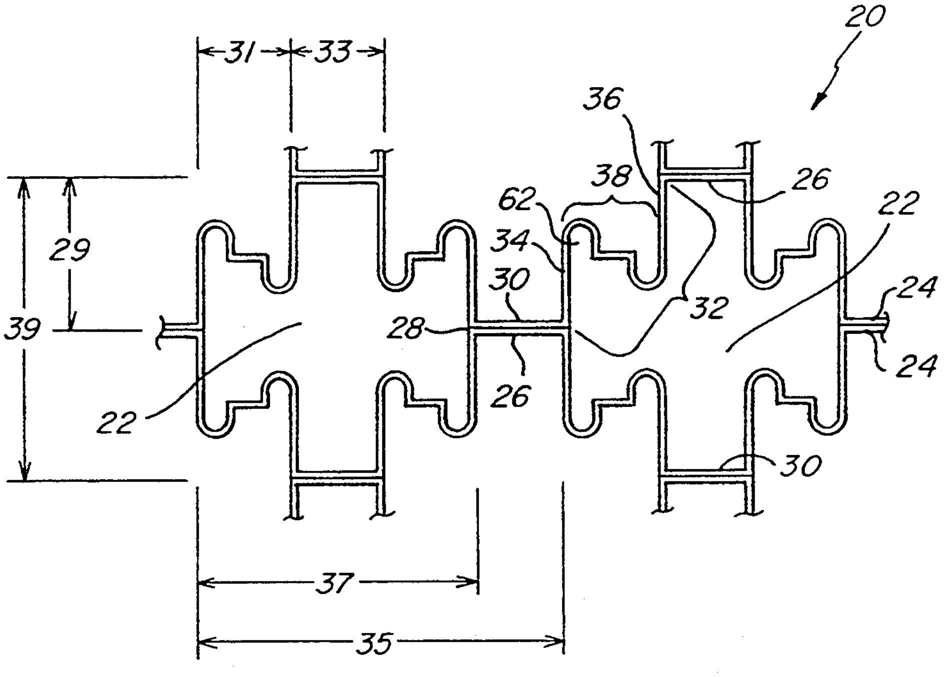
FIG. 1 is a top view of two interconnected cell units which comprise a fragment of cellular material in accordance with one embodiment of the present invention.

Referring now to FIG. 1, two interconnected cell units 22 are shown, comprising a fragment of cellular material 20 fabricated in accordance with one embodiment of the present invention. FIG. 1 is a top view taken in a direction perpendicular to the plane of the material. Cell units 22 are defined by interconnected component strips 24, corrugated so as to comprise alternate ridge portions 26 and groove portions 30 interconnected by step portions 32. Ridge portions 26 and groove portions 30 are substantially flat according to the preferred embodiment of the invention. In the preferred embodiment of FIG. 1, step portions 32 each comprise a first riser 34 extending upwardly from and preferably being substantially perpendicular to groove portion 30, a second riser 36 extending downwardly from and preferably being substantially perpendicular to ridge portion 26, and a furrowed step surface 38 extending between first and second risers 34 and 36 and having at least one indentation 62 formed therein. Although FIG. 1 illustrates a preferred embodiment in which first and second risers 34 and 36 are of approximately equal height, embodiments in which the risers are of unequal heights is within the scope of the present invention.

Each indentation 62 may be of a variety of shapes, as discussed hereinafter, and is preferably substantially semicircular or semi-oval. As used herein, the term "semicircular" is meant to encompass semi-oval and other generally curved indentations. Preferably, indentation 62 extends across the entire thickness of the strip 24 in which it is formed. Thus, in the preferred embodiment, component strips 24 are corrugated so as to define a series of repeating units 35 which each include a ridge portion 26, a groove portion 30, and two step portions 32.

Component strips 24 are arranged such that the ridge portions 26 face the groove portions 30 of adjacent component strips with at least some of the ridge portions 26 being fastened to groove portions 30 to form junctions 28. In the preferred embodiment, all ridge portions 26 are fastened to groove portions 30, with the exception of the outermost strips of the material which contact one adjacent strip only. Ridge portions 26 may be fastened to groove portions 30 to form junctions 28 by a number of techniques known to those skilled in the art, for example by welding, brazing, soldering, by adhesion, etc. The fastening means most suitable for a particular application could be selected by one of ordinary skill in the art with consideration of factors such as the material from which the component strips are made, the desired strength of the fastened junctions, and the cost and/or convenience of the fastening means.

The width 37 of cell unit 22 formed as described above is thus defined by the width 33 of ridge 26 (or groove 30) plus two times the width 31 of step portion 32, and the height 39 of cell unit 22 is defined by two times the height 29 of step portion 32 (the overall depth of corrugation of component strip 24). According to the preferred embodiment illustrated in FIG. 1, the height 39 and width 37 of cell unit 22 are approximately equal. Variation of this relationship is within the scope of the invention, however, and is discussed more fully hereinafter.

Component strips 24 may comprise ribbon material of metals, metal alloys, paper, plastic, ceramics, composite materials or any other corrugatable material which possesses relatively good strength in the direction of its width. "Corrugatable" in this context is understood to mean formable by any means into a desired shape, such as formation with the aid of heat, formation as a melt or precursor fluid, etc. The choice of material may affect the strength-to-weight ratio of the material, the formability of the material, and the cost thereof. Such selection may be made by one skilled in the art to achieve particular goals with respect to the material fabricated. In the preferred embodiment of the present invention, any formable metal material such as aluminum, stainless steel, alloys, or the like is used as ribbon material for component strips 24. The thickness of the ribbon material used for component strips 24 may be selected by one skilled in the art according to well-known parameters.

Component strips 24 may be formed into corrugations in accordance with the present invention by way of the above-mentioned rolling or stamping methods known in the art or by way of other conventional means. Preferably, component strips 24 are corrugated using a die-stamping method, which is more amenable to forming strips which include substantially perpendicular angles such as those discussed above and illustrated in FIG. 1.

Figure 2:
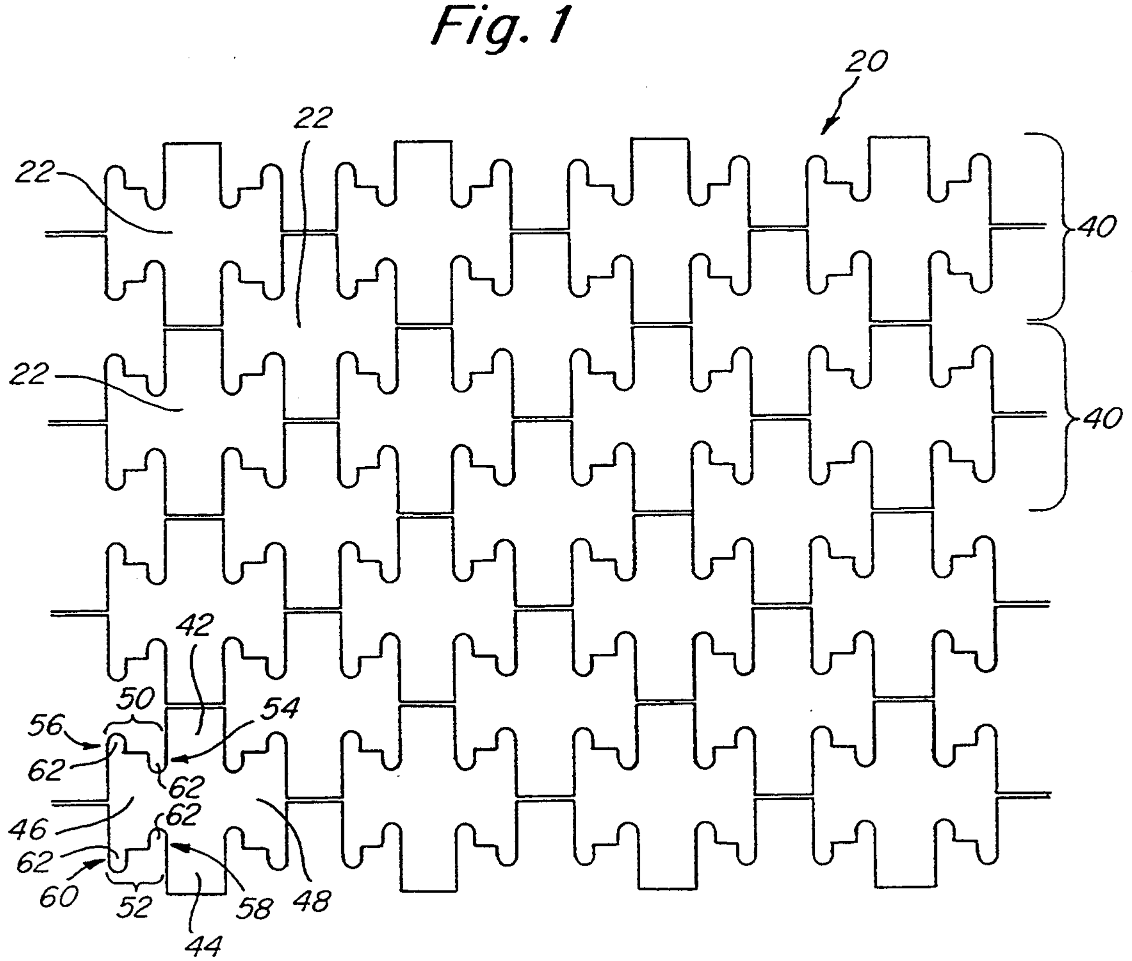
FIG. 2 is a general top view of a sheet of cellular material in accordance with the embodiment of the present invention illustrated in FIG. 1.

FIG. 2 illustrates cellular material formed utilizing the cells of FIG. 1. In FIG. 2 and in all the accompanying figures, elements of the present invention common to several figures are represented by common numerical designations. For purposes of simplicity in illustration, some of the detail of FIG. 1 is omitted in FIG. 2 and in several of the subsequent figures. Illustration is made in FIG. 2 of the plurality of substantially identical, interconnected, cross-shaped cell units 22 arranged in a matrix array, and the fact that the array is defined by interconnected rows 40 of cell units 22 and interstitial spaces between rows 40 which themselves define cell units 22. For purposes of simplicity, distinction will not be made between cell units and interstitial spaces, but reference to both will simply be made as cell units 22.

Cross-shaped cell units 22 each have an upper arm 42, a lower arm 44, and first and second lateral arms 46 and 48, respectively. Each of the first and second lateral arms 46 and 48 has an upper wall 50 and a lower wall 52. Preferably, at least one cell unit of each row has at least one furrowed wall 50 or 52, with each wall 50 and 52 being furrowed for preferred embodiments. Upper wall 50 has an inner end 54 and an outer end 56, and lower wall 52 has an inner end 58 and an outer end 60. Preferably, each of the inner ends 54 and 58, respectively, of upper and lower walls 50 and 52, respectively, has an inwardly-directed substantially semicircular indentation 62 formed therein. Additionally, in the preferred embodiment, each of the outer ends 56 and 60, respectively, of the upper and lower walls 50 and 52, respectively, has an outwardly-directed substantially semicircular indentation 62 formed therein. For purposes of simplicity, one numeral is used to designate each semicircular indentation 62 in the embodiment illustrated in FIG. 2, and in embodiments illustrated in subsequent figures in which substantially semicircular indentations occur.

Figure 3:
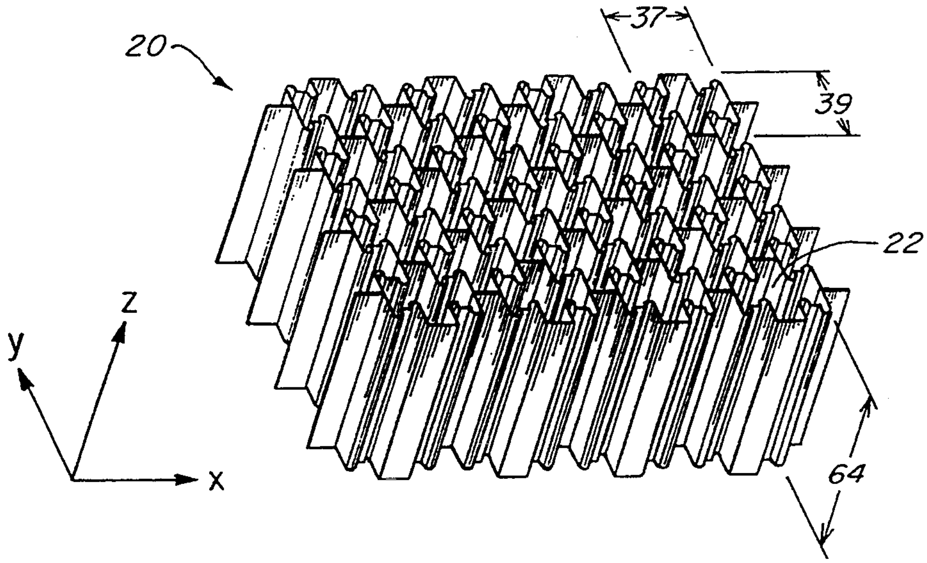
FIG. 3 is a perspective view illustrating a sheet of cellular material in accordance with the embodiment of the present invention illustrated in FIGS. 1 and 2 in a flat condition.

Referring now to FIG. 3, cellular material according to the embodiment of the present invention described above and illustrated in FIGS. 1 and 2 is illustrated in perspective. Axes x, y and z are introduced for purposes of the description. Thickness 64, the dimension of the material along the z-axis, is defined by the width of the component strip ribbon material 24 employed in its fabrication. The width of component strip material 24, defining the thickness 64 of the cellular material from which it is made, is not to be confused with the width 37 of cell 22, or the overall width of the cellular material. Cellular material 20 may be of any thickness 64 desired for a particular application, and is generally from about ⅛ inch to about 6 inches thick. The ratio of thickness 64 to height 39 and width 37 of cell 22 generally controls certain characteristics of the material, with material of a higher ratio providing greater strength along the z-axis, and material with a lower ratio providing greater formability and lower density. According to the embodiment of the present invention heretofore illustrated, wherein the height 39 is approximately equal to the width 37, the ratio of the height 39 of each cell unit to thickness 64 is from about 1/10to about 2/1, preferably from about 1/5to about 1/1.5. Variation of the ratio of height 39 to width 37 and its effect upon the formability of the material of the present invention is described hereinafter.

The overall width of material 20, that is, its dimension along the x-axis, and the height of material 20, that is, its dimension along the y-axis, are variable to a large extent; the material may be fabricated in a wide variety of sizes to satisfy a variety of applications.

Figure 4:
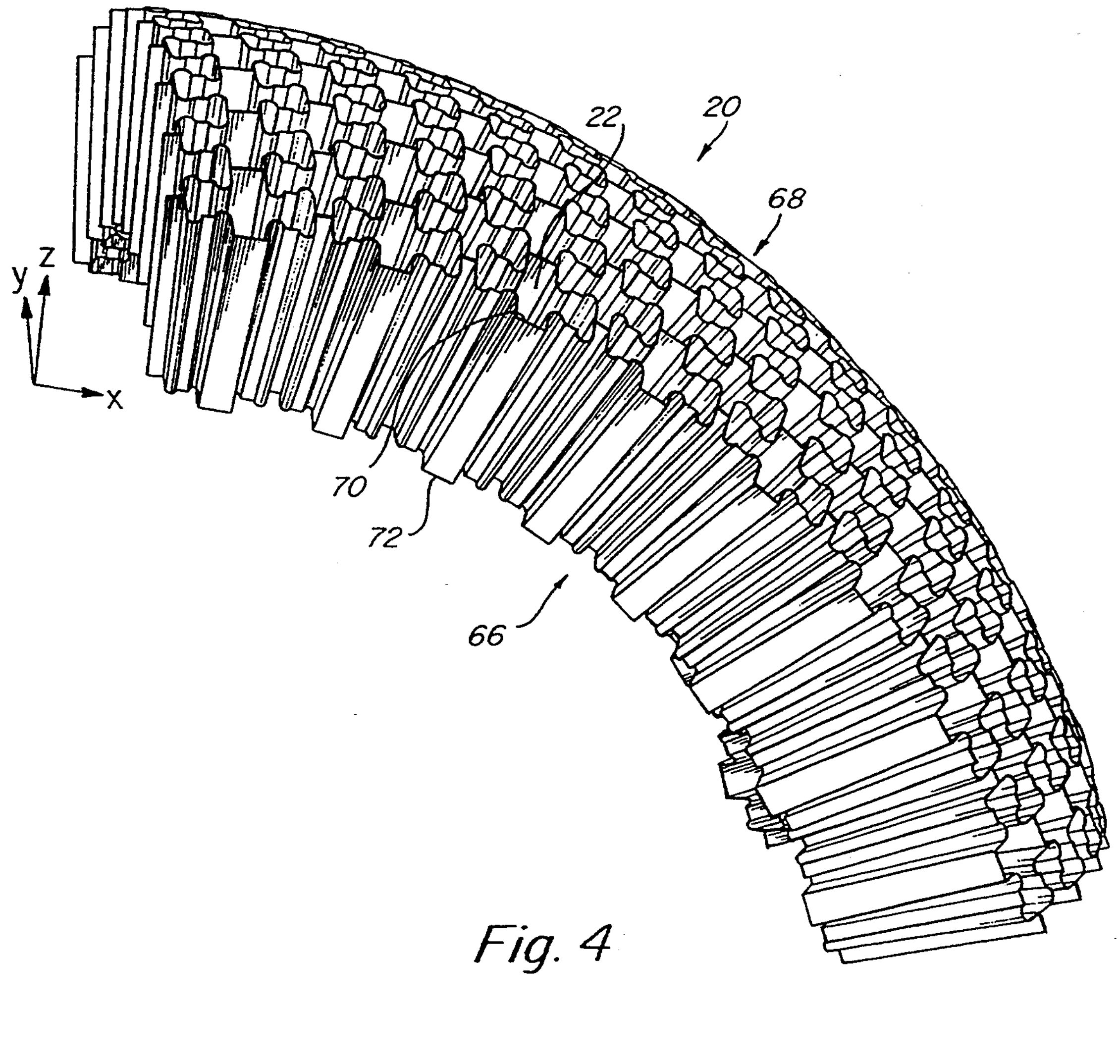
FIG. 4 is a perspective view illustrating the sheet of cellular material shown in FIG. 3 in an arched or curved condition.

The formability of cellular material 20 in accordance with the present invention, that is, its flexibility in the x-y plane, is illustrated in FIG. 4. FIG. 4 is meant to be exemplary and not to illustrate any limit to the formability of the cellular material of the present invention.. The material is shown to exhibit synclastic rather than anticlastic behavior. Synclastic behavior is defined by the ability of the material to be bent along its x-axis to form an arc of a circle having a center on a first side 66 of the material, while simultaneously being bent along its y-axis to form an arc of a circle having a center on the same side 66 of the material. Thus, the material may form a section of a sphere. In contrast, heretofore known cellular material, if formable to any extent, exhibit anticlastic behavior. That is, when bent along its x-axis in the manner illustrated in FIG. 4, prior art material will typically "saddle", that is, will bend in the opposite direction along the y-axis, forming an arc along the y-axis of a circle having a center on the second side 68 of the material 20.

To achieve the formability of the cellular material of the present invention as illustrated in FIG. 4, each cell unit 22 must expand at one end and contract at another end. Specifically, the ends 70 of the unit cells 22 which define outer spherical side 68 of material 20 as illustrated in FIG. 4 must expand in all directions in the x-y plane, while the ends 72 of cell units 22 which define inner spherical surface 66 must be compressed in all directions in the x-y plane.

Referring now to FIGS. 5*a*–5*e*, the flexibility of each cell unit 22 which contributes to the formability of cellular material 20 is illustrated. In FIGS. 5*a*–5*e*, the diagram of one end of a cellular unit 22, that is, an end of the unit at one side of a sheet of cellular material according to a preferred embodiment of the present invention, is illustrated. Specifically, FIG. 5*a* illustrates, in conjunction with FIG. 4, the shape of either end 70 or end 72 of cell unit 22 when material 20 is substantially flat. FIGS. 5*b* and 5*c* illustrate a situation in which the end of cell unit 22 must be compressed, as illustrated in FIG. 4 for end 72. FIG. 5*b* illustrates the flexibility of the end 72 of the cell along the y-axis, that is, compression in the direction of arrows F and G, and FIG. 5*c* illustrates the flexibility of the end 72 of the cell along the x-axis, that is, compression in the direction of arrows H and I. FIGS. 5*d* and 5*e* illustrate expansion of an end of cell unit 22, as illustrated for end 70 of cell unit 22 in FIG. 4. In FIG. 5*d*, expansion along the y-axis, that is, in the direction of arrows J and K, is illustrated. FIG. 5*e* illustrates expansion along the x-axis, that is, expansion in the direction of arrows L and M. Thus, any end 70 or 72 of a cell unit 22 may be expanded or compressed in any number of directions in the x-y plane.

Referring again to FIG. 4, it can be seen that when cellular material 20 is bent along both its x and y axes, expansion of end 70 of cell unit 22 must occur in the x-y plane simultaneously with compression of end 72 in the x-y plane. In such a situation, referring again to FIG. 5, each cell unit must expand at one end in accordance with FIGS. 5*d* and 5*e* while being compressed at its other end in accordance with FIGS. 5*b* and 5*c*. That is, the unique cell design of the present invention allows each end 70 of each cell unit 22 to expand radially outwardly from a line drawn through the cell parallel to the z-axis, while allowing each end 72 of each cell unit 22 to be compressed radially inwardly toward the line, when the material is formed as illustrated in FIG. 4.

Referring now to FIGS. 6 and 7, the ability of the cellular material according to a preferred embodiment of the present invention to undergo such conformation is illustrated. In FIG. 6, a first riser 34, a second riser 36, and a furrowed step surface 38 of a cell unit which is expanded along the x-axis, that is, expanded in the direction of arrows L and M (referring also to FIG. 5*e*) at end 70, and compressed along the x-axis, that is, in the direction of arrows H and I (referring also to FIG. 5*c*) at end 72 is illustrated. Indentations in step surface 38, especially semicircular indentations 62, facilitate such simultaneous expansion and compression of respective ends of the cell unit. Referring now to FIG. 7, a similar portion as that illustrated in FIG. 6 of a cell unit 22 in which end 70 is expanded along the y-axis, that is, in the direction of arrows J and K (referring also to FIG. 5*d*) and in which end 72 is compressed along the y-axis, that is, in the direction of arrows F and G (referring also to FIG. 5*b*) is illustrated. Again, the unique furrowed step surface 38, including substantially semicircular indentations 62 in the preferred embodiment illustrated in FIG. 7, facilitates such simultaneous expansion and contraction.

Thus, it can be seen from the preceding figures that the preferred embodiment of cellular material 20 in accordance with the present invention is uniquely designed to exhibit highly synclastic behavior, that is, extremely good formability.

Figure 8A:
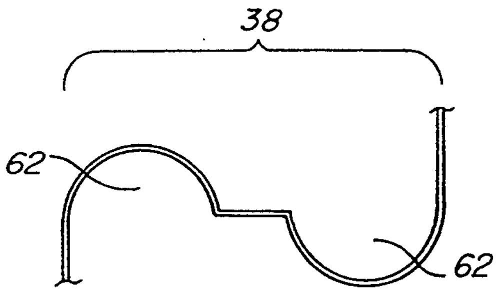
Figure 8B:
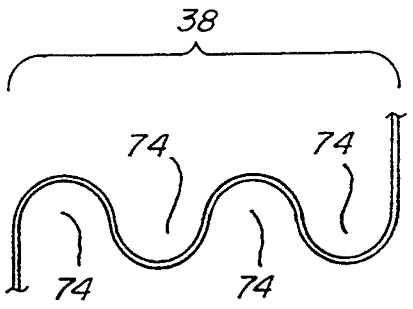
Figure 8C:
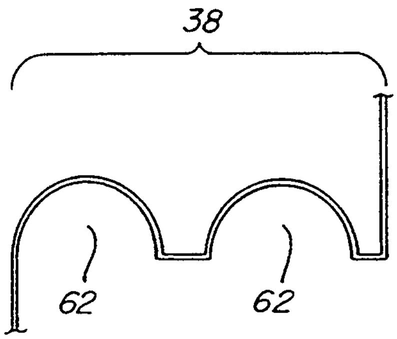
Figure 8D:
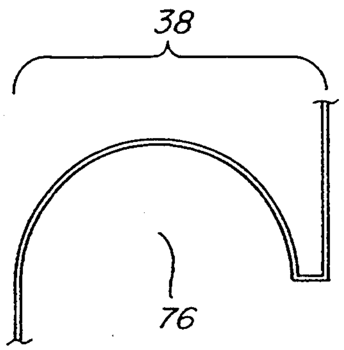
Figure 8E:
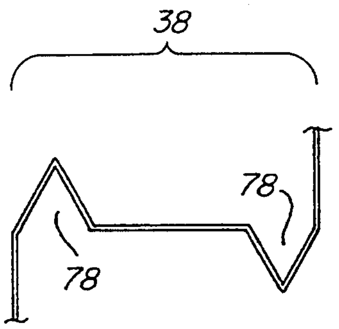
Figure 8F:
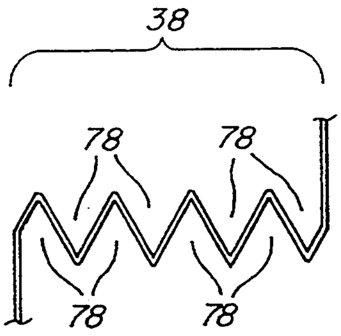

Referring now to FIGS. 8*a*–8*f*, various exemplary shapes of furrowed step surface 38 are illustrated. Specifically, FIG. 8*a* illustrates the shape illustrated heretofore, that is, a furrowed step surface having upwardly-directed and downwardly-directed substantially semicircular indentations 62 formed therein. FIG. 8*b* illustrates a furrowed step surface 38 in which a plurality of substantially semicircular indentations 74 are formed therein, resulting in a substantially sinusoidal furrowed step surface. FIG. 8*c* illustrates a furrowed step surface 38 in which two substantially semicircular indentations 62 are formed in the step surface, both in the same direction. FIG. 8*d* illustrates a furrowed step surface 38 having one large semicircular indentation 76 formed therein. FIG. 8*e* illustrates furrowed step surface 38 having first and second creases 78 formed therein in opposite directions, at opposite ends of the step surface. FIG. 8*f* illustrates furrowed step surface 38 having a plurality of creases 78 formed therein, resulting in a substantially rimpled step surface.

FIGS. 8*a*–8*f* are meant to be non-limiting examples of various embodiments of step surface 38 of cellular material 20 of the present invention. It is to be understood that other shapes of furrowed step surface which imparts synclastic behavior to the overall material may serve as furrowed step surface 38.

Referring now to FIGS. 9 and 10, alternate embodiments of cellular material 20 are illustrated. In FIG. 9 component strips 24 have been fabricated such that the resultant cell units 22 are of a width 78-to-height 80 ratio that is greater than the width 37-to-height 39 ratio of cell units 22 illustrated in FIGS. 1–8. Specifically, according to the embodiment illustrated in FIG. 9, the width 78-to-height 80 ratio is from about 5:1 to about 1:1. In the embodiment illustrated in FIG. 10, the width 82-to-height 84 ratio of cell units 22 is substantially less, specifically from about 1:1 to about 1:5. Additionally, FIG. 10 illustrates an embodiment in which first riser 34 is shorter than is second riser 36. It is noted that when first and second risers 34 and 36 are not of substantially equal size, cell units 22 are not substantially identical throughout the material. Variation of the parameters noted with respect to FIGS. 9 and 10 lends variation to the formability of the cellular material, and may lend formability to the material in one direction preferably as compared to another.

Referring now to FIG. 11, an alternate embodiment of the present invention is illustrated which comprises cellular material 20 formed of a plurality of component strips 24 which each comprise alternate ridge portions 26 and groove portions 30 interconnected by step portions 32. However, in the embodiment illustrated in FIG. 11, only one step portion 32 of each component strip 24 includes a furrowed step surface 38, the remaining step portions 32 including flat step surfaces 86. In the embodiment illustrated, the furrowed step surfaces 38 are formed at various locations along the length of each component strip such that when the strips are joined as described above to form cellular material 20, a diagonal at approximately 45° in the x-y plane including each furrowed step surface is created. Such a cellular material will exhibit flexibility specifically along such a line. According to the present invention, a furrowed step surface 38 may be created at any number of locations along each component strip 24, and component strips 24 may be arranged such that these furrowed step surfaces occurring at predetermined locations are arranged at specific locations throughout the cellular material. Additionally, any type of furrowed surface may be formed at the locations described above. Thus, the degree and direction of formability of the cellular material according to the present invention may be tailored.

Referring now to FIGS. 12 and 13, cellular material in accordance with an alternate embodiment of the present invention and an alternate method of forming cellular material is illustrated. According to the method, and referring to FIG. 12, a plurality of component strips 85, 87, 89, and 93 are provided having a plurality of indentations 88 formed therein at regular intervals along each of the component strips such that each strip comprises a succession of flat segments 90 separated by indentations 88. Indentations 88 preferably extend across the entire width of the component strips.

Adhesive 92 is applied to a portion 94 of each of a first set of alternate flat segments 96 of a first side 98 of the first component strip 85, a second set of alternate flat segments 91 remaining free of adhesive. Then a second side 95 of a second component strip 87 is placed adjacent the first side 98 of the first component strip 85 such that the indentations 88 of the second strip 87 are aligned with the indentation 88 of the first strip 85. In the preferred embodiment, as illustrated in FIG. 12, indentations 88 of each component strip as stacked are formed in the same direction in relation to the plane of each strip. Adhesive 92 is then applied to a portion 100 of each of a first set 102 of alternate flat segments of the first side 104 of the second component strip 85, a second set of alternate flat segments 105 remaining free of adhesive, the first set of alternate flat segments 102 of the second component strip being aligned with the second set of alternate flat segments 91 of the first component strip.

As many additional component strips as are desired may be added to the stack of component strips as described above. Then, the adhesive is allowed to dry and the first strip 85 is drawn in a direction indicated by arrows N away from the final component strip 93, which is drawn in a direction indicated by arrows O, to expand the core. After expansion, cellular material 106, as illustrated in FIG. 13, results.

Cellular material 106 may be defined as a plurality of component strips 85, 87, 89, and 93, each comprising alternate ridge portions 108 and groove portions 110 interconnected by slope portions 112, with at least one of the slope portions, and many or all of the slope portions in the preferred embodiment, having at least one indentation 88 formed therein, the indentations preferably extending across the entire width of the component strips. The strips are arranged in a stacked array as described in accordance with above-noted embodiments of the present invention.

It is noted that the size of portions 94 and 100, that is, their length along their respective strips, affects the resultant shape of the cell units of the expanded material. If the portions are small, the resultant material will have substantially square cell unit shapes, with small ridge portions 108 and groove portions 110. If the portions are larger, the resultant material will be defined by cell units of a honeycomb or substantially hexagonal shape, with larger ridge portions 108 and groove portions 110. It is noted that portions 94 and 100 (and resultant ridge portions 108 and groove portions 110) need not be of uniform size for any given cellular material.

The embodiment illustrated in FIGS. 12 and 13 is representative only. Indentations 88 may take a variety of shapes such as creases and other shapes described above and illustrated in FIGS. 8*a*–8*f*, or other shapes which result in synclastic cellular material. According to the method of the present invention described with reference to FIGS. 12 and 13, slope portions 112 each comprise one half of a flat segment of a component strip to which adhesive is not applied, less ridge and groove portions 108 and 110, respectively.

According to another method of the present invention (with reference to FIGS. 12 and 13), indentations 88 may be formed in the component strips 85, 87, 89, and 93 after the strips are stacked. That is, the component strips may be stacked with adhesive applied thereto as described above, and then indentations 88 may be formed in a plurality of stacked and adhered strips prior to expansion of the material to give the material 106 illustrated in FIG. 13. Additionally, not only may a variety of shapes of indentations 88 be formed in the component strips, but variation in the frequency of indentation occurring along each component strip may be effected to tailor the resultant cellular material with respect to formability. Also, spot welding, brazing or other conventional fastening techniques may be utilized instead of adhesive in practicing the method described and illustrated in FIGS. 12 and 13.

Another method of tailoring the formability of cellular material in accordance with the present invention involves selective fastening of ridge portions to groove portions of adjacent component strips such that some predetermined fastened junctions are fastened more securely than other predetermined fastened junctions. Such variation in fastening strength may be effected by welding certain predetermined junctions and fastening other predetermined junctions by weak adhesive, or applying strong adhesive to certain predetermined junctions while applying weak adhesive to other predetermined junctions. In any case, the desired result which may be obtained is that, during conformation of the cellular material to a particular surface, or during formation of the cellular material in a particular desired shape, the predetermined weakly-fastened junctions may rupture selectively, adding formability to the cellular material. It should be noted that in many applications in which cellular material may be utilized, for example in surrounding high-pressure containment structures for safety reasons, creating any weakly-fastened junctions may be highly undesirable. Therefore, it is to be understood that the selective creation of weakly and strongly-fastened junctions described herein would be carried out by one skilled in the art for particular applications only.

There have been described above by way of example a number of embodiments of a novel cellular material in addition to a number of methods of forming cellular material, the material of the invention exhibiting highly synclastic behavior. In applying the invention to different applications, modifications may be made to the embodiments described above to illustrate the principles of the invention. Accordingly, the invention should not be limited by the above description of such examples, but should be interpreted only in accordance with the following claims.

What is claimed is:

1. Cellular material comprising:

a plurality of component strips, each of said strips having alternate ridge portions and groove portions interconnected by step portions, said strips being arranged in a stacked array with the ridge portions of each component strip facing the groove portions of an adjacent component strip, and means for fastening at least some of said ridge portions to some of said groove portions, at least one of said step portions of each component strip comprising a furrowed step surface having a first end and a second end, a first riser extending upwardly from said groove portion to said first step surface end and being contiguous with said groove portion and said first step surface end, and a second riser extending downwardly from said ridge portion to said second step surface end and being contiguous with said ridge portion and said second step surface end, wherein said cellular material exhibits synclastic behavior and said at least one furrowed step surface facilitates simultaneous expansion and contraction of said cellular material during exhibition of said synclastic behavior.

2. Cellular material as recited in claim 1, wherein said furrowed step surface comprises a surface having at least one substantially semicircular indentation formed therein.

3. Cellular material as recited in claim 2, wherein said furrowed step surface has a first substantially semicircular indentation formed therein at said first end thereof, and a second semicircular indentation formed therein at said second end thereof.

4. Cellular material as recited in claim 3, wherein said first substantially semicircular indentation is upwardly-directed toward said ridge portion, and said second substantially semicircular indentation is downwardly directed toward said groove portion.

5. Cellular material as recited in claim 3, wherein said first and said second substantially semicircular indentations are each formed in the same direction.

6. Cellular material as recited in claim 2, wherein said furrowed step surface has a substantially sinusoidal shape.

7. Cellular material as recited in claim 1, wherein said furrowed step surface comprises a surface having at least one crease formed therein.

8. Cellular material as recited in claim 7, wherein said furrowed step surface is substantially rimpled, having a plurality of creases formed therein.

9. Cellular material as recited in claim 1, wherein said ridge portions of said components strips are welded to said groove portions of said adjacent component strips.

10. Cellular material as recited in claim 1, wherein said ridge portions of said component strips are fastened to said groove portions of said adjacent component strips with adhesive.

11. Cellular material comprising a plurality of cell units each having a substantially cross-shaped cross-sectional configuration, arranged in a matrix array of rows of interconnected cell units, each cross-shaped cell unit being defined by an upper arm, a lower arm, and first and second lateral arms, at least one cell unit of each row having at least one furrowed wall, wherein said cellular material exhibits synclastic behavior and said at least one furrowed wall facilitates simultaneous expansion and contraction of said cellular material during exhibition of said synclastic behavior.

12. Cellular material as recited in claim 11, wherein said furrowed wall comprises a surface having at least one substantially semicircular indentation formed therein.

13. Cellular material as recited in claim 11, each of said first and second lateral arms having upper and lower walls, each of said upper and lower walls having an inner end and an outer end and having an inwardly-directed substantially semicircular indentation formed therein at said inner end thereof, and an outwardly-directed substantially semicircular indentation formed therein at said outer end thereof.

14. Cellular material as recited in claim 11, each cross-shaped cell unit having a width, a height, and a width-to-height ratio, the width-to-height ratio being from about 5:1 to about 1:5.

15. Cellular material as recited in claim the width-to-height ratio being about 1:1.

16. Cellular material comprising:

a plurality of component strips, each of said strips having alternate ridge portions and groove portions interconnected by slope portions, said strips being arranged in a stacked array with the ridge portions of each component strip facing the groove portions of an adjacent component strip, and means for fastening at least some of said ridge portions to some of said groove portions, at least one of said slope portions having at least one indentation formed therein, wherein said cellular material exhibits synclastic behavior and said at least one indentation facilitates simultaneous expansion and contraction of said cellular material during exhibition of said synclastic behavior.

* * * * *